United States Patent [19]

Lindeperg

[11] Patent Number: 4,733,321
[45] Date of Patent: Mar. 22, 1988

[54] SOLID-STATE INSTANTANEOUS TRIP DEVICE FOR A CURRENT LIMITING CIRCUIT BREAKER

[75] Inventor: Francois Lindeperg, Sassenage, France

[73] Assignee: Merlin Gerin, France

[21] Appl. No.: 37,636

[22] Filed: Apr. 13, 1987

[30] Foreign Application Priority Data

Apr. 30, 1986 [FR] France .................. 86 06431

[51] Int. Cl.$^4$ ........................................ H02H 3/093
[52] U.S. Cl. ......................................... 361/96; 361/97
[58] Field of Search ............... 361/93, 94, 95, 96, 361/97; 207/360, 362

[56] References Cited

U.S. PATENT DOCUMENTS

| | | | |
|---|---|---|---|
| 3,654,516 | 4/1972 | Tracursi .................. | 361/93 X |
| 4,012,669 | 3/1977 | Gelfand et al. .......... | 361/97 |
| 4,266,259 | 5/1981 | Howell ..................... | 361/97 |
| 4,297,741 | 10/1981 | Howell ..................... | 361/93 |
| 4,347,541 | 8/1982 | Chen et al. ............... | 361/97 X |
| 4,442,472 | 4/1984 | Pang et al. ............... | 361/97 X |
| 4,550,360 | 10/1985 | Dougherty ................ | 361/93 |
| 4,605,982 | 8/1986 | Harner et al. ............ | 361/95 X |
| 4,642,724 | 2/1987 | Ruta ........................ | 361/97 X |

FOREIGN PATENT DOCUMENTS 129624 1/1985 European Pat. Off. .

Primary Examiner—A. D. Pellinen
Assistant Examiner—Derek S. Jennings
Attorney, Agent, or Firm—Parkhurst & Oliff

[57] ABSTRACT

An instantaneous solid-state trip device has two threshold values providing an upper and a lower tripping threshold. A current increase rate detector determines, when a short-circuit occurs, the prospective peak current value and, if the peak value corresponding to the electrodynamic withstand of the circuit breaker is liable to be exceeded, causes a change of threshold to bring about tripping, as soon as the lower threshold is exceeded. This high-speed tripping favours short-circuit current limiting. When a short-circuit of a lesser importance occurs, the current variation is lower and the instantaneous trip release only trips when the upper threshold is exceeded. In most cases, this upper threshold is not reached and tripping selectivity can be easily achieved in the usual way. A break in the circuit connecting the sensor to the trip unit also causes the circuit breaker to trip.

9 Claims, 3 Drawing Figures

SOLID-STATE INSTANTANEOUS TRIP DEVICE FOR A CURRENT LIMITING CIRCUIT BREAKER

BACKGROUND OF THE INVENTION

The invention relates to a solid-state trip device having an instantaneous analog trip release to cause high-speed opening of the contacts of a circuit breaker with current limiting.

Limiting circuit breakers perform short-circuit current limiting after high-speed opening of the contacts and breaking of the current, before the latter has been able to reach high values. This high-speed opening of the contacts opposes the selectivity effect which requires a sufficient time delay for the fault to be cleared by a downstream circuit breaker. It has already been proposed to conciliate selectivity and current limiting by causing high-speed opening of the contacts, in the event of a short-circuit occurring, followed by reclosing of these contacts to resupply the unaffected parts of the electrical system, but such devices are complicated and involve contact bounce.

SUMMARY OF THE INVENTION

The object of the present invention is to achieve a mixed system which gives priority, in certain cases, to selectivity, and in other cases to current limiting. The invention is based on the fact that current limiting takes priority in the case of strong short-circuit currents, which must be limited to avoid the circuit breaker and supplied circuits being damaged. In these exceptional cases, selectivity is sacrificed to current limiting. For normal short-circuit currents which reach values lower than the circuit breaker electrodynamic withstand level, the current limiting effect is superfluous and selectivity can be given priority.

The solid-state trip device according to the invention comprises an analog instantaneous trip release to bring about high-speed opening of the contacts of a circuit breaker with current limiting comprising:
- a current sensor which generates a derivative analog signal di/dt proportional to the derivative in relation to time of the current flowing in a conductor of the circuit breaker,
- an integrating circuit receiving said derivative signal di/dt and emitting a signal representative of the current i,
- a first threshold comparator circuit comparing said signal representative of the current and an upper threshold value to emit an instantaneous tripping signal when said current signal i exceeds said upper threshold value,
- a second threshold comparator circuit comparing said derivative signal di/dt with a second threshold value to generate a selection signal of a lower instantaneous tripping threshold, when said derivative signal exceeds said second threshold.

The current derivative, in relation to time, corresponds to the short-circuit current increase rate and this value provides an indication, as soon as the short-circuit current occurs, of the peak current value which will be reached if interruption is not performed by the circuit breaker. If this prospective peak value does not exceed the electrodynamic withstand limit of the circuit breaker, the instantaneous trip release is set for an upper tripping threshold value. Selectively can thus be provided by the short delay and long delay trip release or any other selectivity device requiring a time delay. If, on the other hand, the prospective short-circuit current exceeds the electrodynamic withstand limit of the circuit breaker, the instantaneous trip release operates for a lower threshold causing high-speed opening of the circuit breaker contacts. It can easily be understood that this lower threshold is exceeded more quickly the lower its value, which enables high-speed opening of the contacts and current limiting, but this lower threshold is naturally higher than the rated current of the circuit breaker. The change of threshold is controlled by the current increase rate, when a short-circuit occurs, but to avoid untimely trips due to disturbances or interference leading to a sudden current variation, it is important that tripping of the circuit breaker be dependent on the presence of an instantaneous current having a value greater than the circuit breaker rated current. The derivative current signal determines the operation of the instantaneous trip release for the upper threshold or the lower threshold.

The derivative current signal is advantageously supplied by a non-magnetic type sensor which directly delivers a voltage signal proportional to the derivative of the current to be measured. The derivative signal is compared with a threshold value in a comparator circuit to select the upper threshold or the lower threshold according to whether this threshold value is exceeded or not. The same derivative signal is advantageously integrated to supply a signal proportional to the current itself compared to said upper threshold and lower threshold to cause tripping of the circuit breaker, when the selected threshold is exceeded.

According to an embodiment of the invention, the instantaneous trip release can be used for monitoring the continuity of the measuring circuit. In this respect, a direct current is applied to the sensor, causing a predetermined voltage to appear at the terminals of this sensor, when the circuit is not interrupted. When the sensor circuit is interrupted, the voltage at the terminals increases and is interpreted by the instantaneous trip release as a short-circuit current causing tripping. This monitoring circuit prevents the circuit breaker from operating with a disconnected or faulty sensor. The direct current is applied in proximity to the processing circuit in order to monitor the continuity of the whole sensor connection circuit, as well as the sensor itself.

The instantaneous trip release according to the invention is preferably an analog trip release whose speed of response is faster than that of a digital trip release. This speed of response naturally contributes to the limiting effect sought for. It is also advisable to use for each phase an independent sensor and processing circuit, each being capable of causing tripping of the circuit breaker. This individualization of the sensors and instantaneous trip releases plays its part in giving a higher speed of response and increased reliability, failure of one of the circuits being made up for by operation of another, which has a very good chance of also seeing the short-circuit in case of a fault.

The instantaneous trip release can be associated with a standard short delay and long delay electronic circuit breaker, the same relay being advantageously used to bring about instantaneous tripping of the circuit breaker. The short delay, long delay trip release may be of the own current type using current transformers supplying the current measurement signal, as well as the power supply of the electronic circuits and tripping relay. it should be noted that the derivative signal, supplied by the non-magnetic sensors, can be used for long delay and short delay tripping in a manner well known in the art.

BRIEF DESCRIPTION OF THE DRAWINGS

Other advantages and characteristics will become more clearly apparent from the following description of an embodiment of the invention, given as an example only, and represented in the accompanying drawings, in which.

DESCRIPTION OF THE PREFERRED EMBODIMENT

Figure 1:
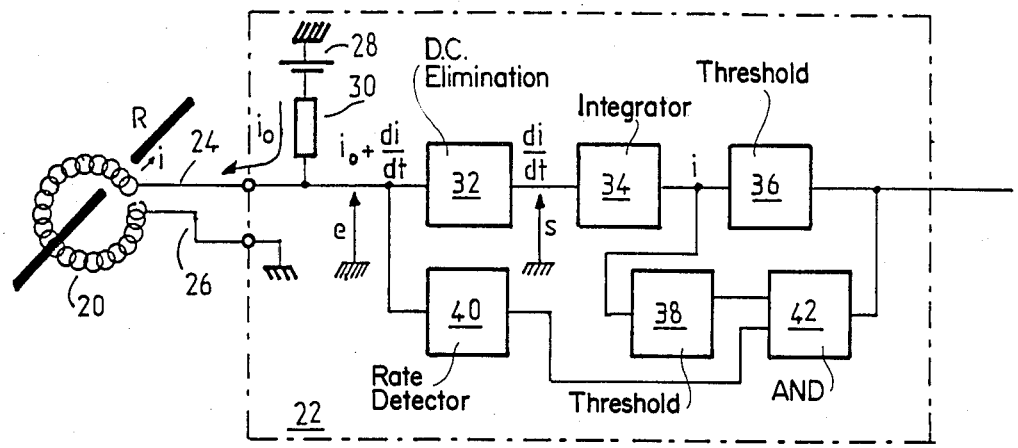
FIG. 1 represents the block diagram of an instantaneous trip release according to the invention.

In the figures, an electrical circuit breaker, notably a low voltage circuit breaker, comprises mechanical contacts 10, operated by a mechanism 12, actuated by a trip relay 14 receiving tripping orders from an instantaneous trip release 16 and a long delay, short delay trip release 18. The circuit breaker could also be of the solid-state type. The instantaneous trip release 16 comprises three sensors 20, each associated with one of the circuit breaker conductors R, S, T to supply a signal to a trip unit 22. Only one of the sensors 20 and one of the trip units 22 are described hereinafter when referring to FIGS. 1 and 2, the others being identical.

The sensor 20 is of the non-magnetic type, for example made up of a secondary winding borne by a non-magnetic support in the form of a tore through which passes the conductor R constituting the primary winding. Such a sensor 20 is known to deliver a voltage signal proportional to the derivative of the current, in relation to time, flowing in the conductor R. The sensor 20 is connected by conductors 24, 26 to the trip unit 22, for example made up of a printed circuit board bearing the instantaneous trip release components and circuits. A direct current io, supplied by a current source 28, connected by means of a resistor 30 to the conductor 24, 26, is applied to the secondary winding of the sensor 20. This direct current io is applied at the level of the board 22 to check the integrity of the circuit made up by the conductors 24, 26 and the sensor 20. The signal e supplied by the sensor 20 is a function of the voltage induced at the terminals of the sensor 20 by the current io and of the derivative di/dt of the current i flowing in the conductor R. This voltage signal e is applied to a voltage monitoring unit 32 which eliminates the D.C. component io. The output signal from the unit 32 is representative of the value di/dt which is applied to an integrating unit 34 delivering a signal i proportional to the current flowing in the conductor R. The signal i is applied to a upper threshold detector unit 36 and to a lower threshold detector unit 38, whose outputs deliver a tripping signal when a predetermined upper threshold and lower threshold are respectively exceeded. The signal e delivered by the sensor 20 is applied in parallel to a detection unit 40 of the rate of increase of the current i flowing in the conductor R. When this rate of increase exceeds a predetermined value, the unit 40 emits a signal applied to one of the inputs of an AND gate 42 the other input of which receives the tripping signal from the lower threshold detection unit 38. The AND gate transmits the tripping signal if a signal is present on both its inputs, i.e. when both the current i is greater than the upper threshold and the derivative of the current i in relation to time is greater than a predetermined value.

Figure 2:
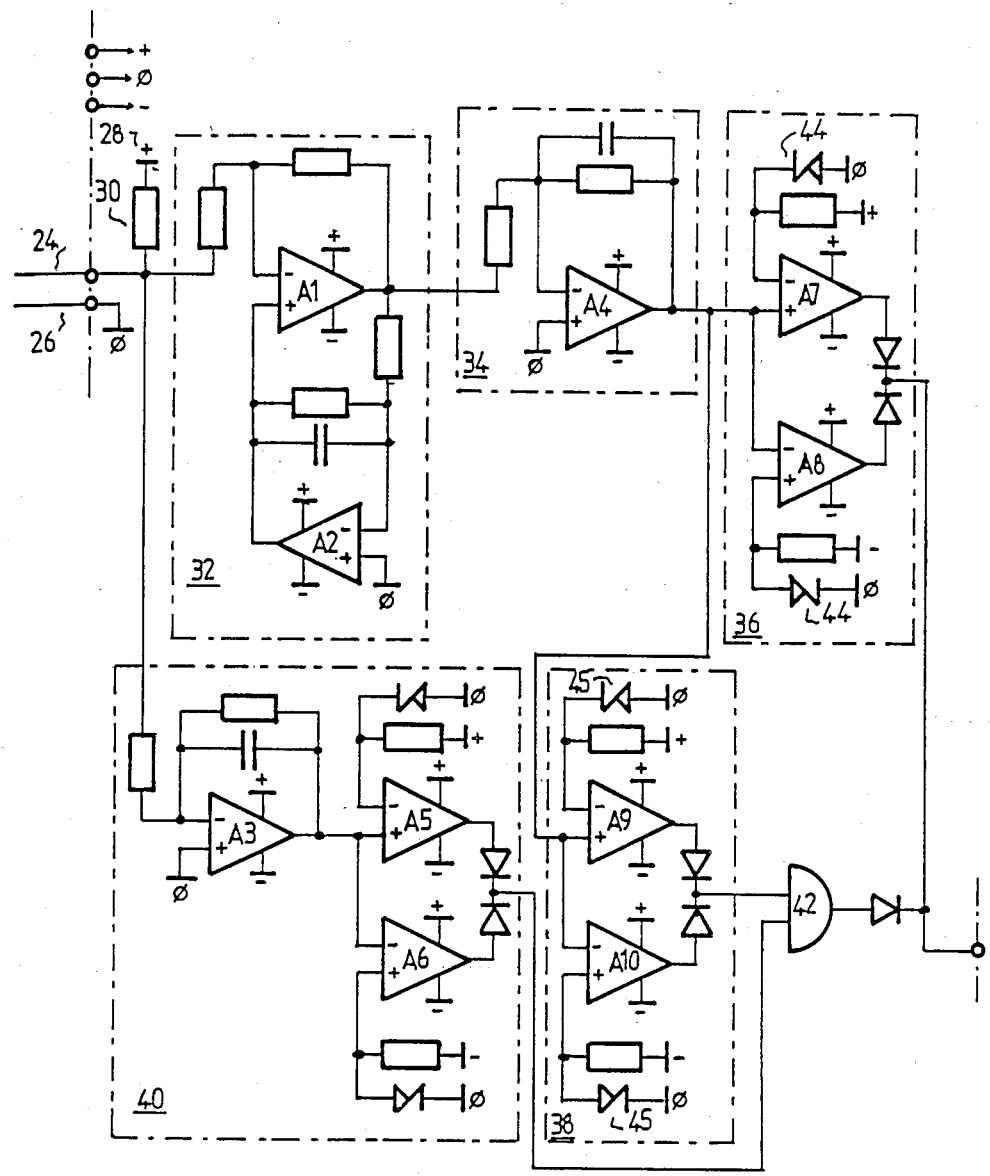
FIG. 2 is a detailed view of the trip release diagram according to FIG. 1.

The trip unit 22 circuits, illustrated in FIG. 2, are analog circuits using operational amplifiers A1 to A10. The connecting monitoring unit 32 uses two loop-mounted operational amplifiers A1, A2, to eliminate the direct current component io. The threshold detection units 36, 38 each comprise two operational amplifiers A7, A8 ; A9, A10 one input of which is polarized at a threshold voltage determined by a Zener diode 44, 45. The detection unit 40 of the rate of increase of the current i comprises a threshold circuit of the same kind with two amplifiers A5 and A6, connected to the output of an operational amplifier A3. Analog circuits of this kind are well known in the art and it is of no point describing them in further detail here.

The threshold of the upper threshold detector 36 corresponds appreciably to the electrodynamic withstand of the circuit breaker, i.e. the maximum value which can be withstood by the circuit breaker without notable damage. The lower threshold value of the detector 38 is greater than the rated current i of the circuit breaker. The value of the direct current io is determined in such a way that the voltage increase of the signal e when the circuit 24, 26, 20 is interrupted is sufficient to cause tripping by the upper threshold detector 36. The unit 40 reacting to the current variation in relation to time is set in such a way as to generate a signal when this value, corresponding to the slope of the curve representing the current in relation to time, is greater than that of the curve having as peak current value the circuit breaker electrodynamic withstand limit.

Operation of the instantaneous trip release according to the invention is as follows:

In normal operation, the current i flowing in the conductor R is lower than the value of the lower threshold detector 38 and the variations of this current di/dt are lower than the reaction threshold of the unit 40. The trip unit 22 does not send a tripping order. When a relatively weak short-circuit occurs, with a prospective peak value lower than the upper threshold of the detector 36, in particular lower than the electrodynamic withstand threshold of the circuit breaker, the signal di/dt remains lower than the response threshold of the rate of current increase unit 40, and the trip unit 22 only reacts to the upper threshold determined by the detector 36. If the value of the current i remains lower than this upper threshold, the instantaneous trip release does not produce any tripping order. If, on the contrary, the current i exceeds this threshold, for example due to an unexpected evolution of the short-circuit current, the instantaneous trip release reacts and causes tripping to protect the circuit breaker and the supplied circuits. When a strong short-circuit occurs involving a signal di/dt greater than the threshold of the unit 40, the latter supplies a signal to the input of the AND gate 42. In parallel, the integrating unit 34 transmits a signal respresentative of the current i to the lower threshold detection unit 38 which transmits a tripping signal to the AND gate 42 as soon as the value of the current i exceeds this threshold. This overshoot occurs very quickly and enables the circuit breaker to be tripped quickly with a high current limiting effect. As soon as the current i exceeds the upper threshold of the detector 36, a second tripping signal is transmitted to the circuit breaker, but this second signal has no effect, since it occurs after that of the lower threshold detector 38. It is clear that the change of threshold, determined by the unit 40, enables tripping to take place more quickly thus favoring short-circuit current limiting.

In case of the connecting conductors 24, 26 or the sensor 20 being interrupted, the voltage increase at the terminals of the sensor 20, due to this interruption, causes a signal i greater than the upper threshold of the detector unit 36, which emits a tripping signal causing the circuit breaker to trip. Proper connection of the sensor 20 to the trip unit 22 is thus permanently monitored, any defect resulting in the circuit breaker tripping. Tripping for a current value i equal to the lower threshold of the detector 38 can only occur if this overshoot coincides with a current variation greater than the threshold value of the unit 40. Inversely, a large current variation exceeding the threshold value of the unit 40 causes tripping only if at the same time the current i exceeds the lower threshold of the detector 38. In this way untimely trips, due to sudden current variations of limited amplitude, are avoided.

Figure 3:
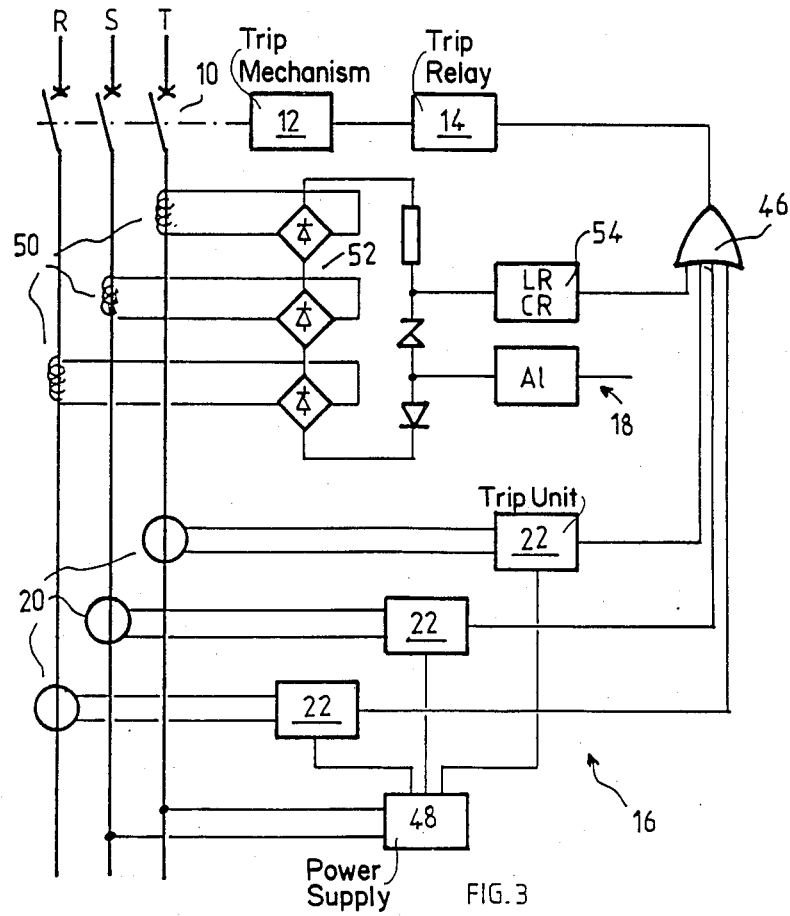
FIG. 3 shows the block diagram of a solid-state trip unit with an instantaneous trip release and a long delay and short delay trip release.

Referring to FIG. 3, it can be seen that a sensor 20 is associated with each of the circuit breaker conductors R, S, T, each sensor 20 being connected to a trip unit 22. The outputs of the three trip units 22 are applied to an OR gate 46, whose output is connected to the trip relay 14. The trip units 22 are connected to a power supply unit 48, for example connected to the conductors S, T, or to any other voltage supply. Tripping of the circuit breaker 10 is caused by the tripping signal of any one of the instantaneous trip units 22. This separation of the different instantaneous trip circuits increases the reliability of the assembly, a strong short-circuit generally being seen by at least two of the conductors R, S, T, and failure of one of the trip units 22 therefore not having a great effect.

The instantaneous trip release according to the invention is generally associated with a standard long delay, short delay trip release, one embodiment of which is represented in diagram form in FIG. 3. The long delay, short delay trip release delivers a tripping signal to one of the inputs of the gate 46 in parallel with the instantaneous trip units 22. The long delay short delay trip unit 18 comprises three current transformers 50, connected to rectifier bridges 52 connected in series to deliver a signal proportional to the maximum intensity current flowing in one of the conductors R, S, T. This signal is applied to a processing unit 54, giving rise to a long or short time delayed tripping signal, when a short delay or long delay threshold is exceeded in a manner well known in the art. It is clear that the instantaneous trip release may be associated with a trip unit of a different type, for example with digital processing or with a standard electromechanical tripping system. The threshold change system when a strong short-circuit occurs enables a sufficient time delay to be kept for selective trips for all short-circuit values which do not endanger the integrity of the circuit breaker, i.e. all peak values which remain lower than the electrodynamic withstand of the circuit breaker.

The invention is of course not limited to the embodiment more particularly described above, but extends to any alternative embodiment, notably where the sensor 20 is of a different type or where the value of the current variation in terms of time is determined by electronic processing circuits.

I claim:

1. A solid-state trip device having an analog instantaneous trip release to bring about high-speed opening of the contacts of a circuit breaker with current limiting comprising:

a current sensor which generates a derivative analog signal di/dt proportional to the derivative in relation to time of the current flowing in a conductor of the circuit breaker, an integrating circuit receiving said derivative signal di/dt and emitting a signal representative of the current i, a first threshold comparator circuit comparing said signal representative of the current and an upper threshold value to emit an instantaneous tripping signal when said current signal i exceeds said upper threshold value, a second threshold comparator circuit comparing said derivative signal di/dt with a second threshold value to generate a selection signal of a lower instantaneous tripping threshold, when said derivative signal exceeds said second threshold.

2. A trip device according to claim 1, comprising a third comparator circuit comparing said signal representative of the current i and said lower threshold to emit a tripping signal applied to an input of an AND gate the other input of which receives said lower threshold selection signal.

3. A trip device according to claim 2, wherein the output of said AND gate and the output of said first comparator circuit are connected to a tripping relay of said circuit breaker.

4. A trip device according to claim 1, wherein said sensor is made up of a non-magnetic tore having a primary winding constituted by said conductor and a secondary winding generating said derivative signal di/dt.

5. A trip device according to claim 4, wherein said secondary winding is connected via a resistor to a direct current source which generates a direct current signal io superposed on said analog derivative signal di/dt.

6. A trip device according to claim 5, comprising a processing circuit of said derivative signal di/dt and direct current signal io which, in normal operation, eliminates said direct current signal io and which generates a tripping signal when the secondary winding is disconnected from said current source.

7. A trip device according to claim 5, comprising an electronic unit or board supporting said integrating and comparator circuits and the resistor associated with the direct current source, said sensor being connected by means of an external connection to said unit.

8. A trip device for a multipole circuit breaker according to claim 1, wherein each pole is associated with a solid-state instantaneous trip release, the outputs of all of said solidstate instantaneous trip releases being connected to a tripping relay of the circuit breaker to cause the latter to trip on an order from any one of said solid-state instantaneous trip releases.

9. A trip device according to claim 1, comprising a long delay and short delay solid-state trip release, having a current sensor and a processing unit of the signal emitted by the current sensor, to deliver a long delay or short delay tripping signal in the event of a fault and a tripping relay common to the long delay, short relay trip release and to the instantaneous trip release.

* * * * *